(12) United States Patent
Emberton et al.

(10) Patent No.: US 6,349,320 B1
(45) Date of Patent: Feb. 19, 2002

(54) COMPUTER EXECUTABLE WORKFLOW MANAGEMENT AND CONTROL SYSTEM

(75) Inventors: William T. Emberton, Stonington, CT (US); Ramachandran Ramgopal, Andover, MA (US)

(73) Assignee: FMR Corp., Boston, MA (US)

( * ) Notice: Subject to any disclaimer, the term of this patent is extended or adjusted under 35 U.S.C. 154(b) by 0 days.

(21) Appl. No.: 08/868,306

(22) Filed: Jun. 3, 1997

(51) Int. Cl.[7] ................................................ G06F 9/00
(52) U.S. Cl. ...................................................... 709/100
(58) Field of Search ................................ 709/100–107, 709/206

(56) References Cited

U.S. PATENT DOCUMENTS

| | | | |
|---|---|---|---|
| 4,503,499 A | * 3/1985 | Mason et al. | 364/222 |
| 5,077,666 A | 12/1991 | Brimm et al. | 364/413.02 |
| 5,168,444 A | 12/1992 | Cukor et al. | 364/401 |
| 5,182,705 A | 1/1993 | Barr et al. | 364/401 |
| 5,191,522 A | 3/1993 | Bosco et al. | 364/401 |
| 5,191,525 A | 3/1993 | LeBrun et al. | 364/419 |
| 5,208,748 A | 5/1993 | Flores et al. | 364/419 |
| 5,446,740 A | 8/1995 | Yien et al. | 370/110.1 |
| 5,535,322 A | * 7/1996 | Hecht | 395/155 |

FOREIGN PATENT DOCUMENTS

| | | | | |
|---|---|---|---|---|
| EP | 0774725 | 5/1997 | | 17/60 |
| WO | 94/16397 | 7/1994 | | 15/40 |

OTHER PUBLICATIONS

Medina–Mora et al, "The Action Workflow Approach to Workflow Management Technology", CSCW '92 Proceedings pp. 281–287, Nov. 1992.*
Workflow Management Coalition "Workflow Management Coalition Terminology & Glossary" Jun. 1996 Issue 2.0 pp. 1–59.

* cited by examiner

Primary Examiner—Majid A. Banankhah
(74) Attorney, Agent, or Firm—Fish & Richardson P.C.

(57) ABSTRACT

A computer system executable method is provided for use in providing work items to a computer station from a database of work items. The method includes generating a sequence for providing at least some of the work items to the computer station and, before the sequence has been fully exhausted, e.g., when the sequence has become stale, generating a substitute sequence for providing at least some of the work items.

14 Claims, 9 Drawing Sheets

COMPUTER EXECUTABLE WORKFLOW MANAGEMENT AND CONTROL SYSTEM

BACKGROUND OF THE INVENTION

The invention relates generally to computer executable workflow management and control systems and more particularly to computer executable methods for selectively providing work items to an operator attended computer workstation from a plurality of work items stored in a database accessible by the computer workstation.

As is known in the art, members of an organization are provided work items for execution from a database of unexecuted work items. These work items represent tasks such as filling out documents, returning telephone calls to potential or existing customers, initiating transactions, or similar duties. Work items may arrive at the database from outside the organization or from inside the organization or both. For example, if the organization provides financial services, the work items may relate to client account maintenance, buy and sell orders, internal management directives, and the like.

Efficiency gains can be accomplished by implementing a workflow management system which automates a process for distributing the work items to the members. In the workflow management system, each member becomes an operator situated at a computer station, such as a personal computer. The computer stations are connected to a computer system running a workflow application program. After an assigned work item is completed, a new work item is provided from the database to the computer station in response to a request from the computer station. Usually, the workflow application program initially stores the work items in a database and subsequently distributes the work items to the members in accordance with a set of rules tailored to the organization's particular needs. Typically, each time one of these requests is received by the workflow application program, the workflow application program conducts a search of the database to find a most appropriate work item to provide to the member in response for execution at the operator workstation.

An enhanced workflow management system has been proposed for anticipating requests from a particular type of computer station. In such a system, work items appropriate for execution by such a computer station are represented in a list of entries produced by an anticipatory search of the database. More particularly, the list corresponds to a batch of work items. The enhanced system's workflow application program does not conduct a search of the database each time a request arrives. Rather, the workflow application program responds to a request for a new work item by providing from the batch an unexecuted work item represented by an entry in the list. After the member has completed, or exhausted by execution, all work items in the batch, the workflow application program uses another anticipatory search to produce a new list corresponding to a new batch of work items.

SUMMARY OF THE INVENTION

In accordance with one aspect of the invention, a computer system executable method is provided for use in providing work items to an operator attended computer station from a plurality of work items stored in a database accessible by the computer station. The method includes generating a sequence (e.g., a first ordered list of work items) for providing the work items to the computer station, and, before the sequence has been fully exhausted, generating a substitute sequence (e.g., a second ordered list of work items) for providing the work items.

This method of generating the sequence and the substitute sequence allows the system to be timely with respect to taking into account new work items arriving in the database of work items. In particular, the computer station is able to gain access to high-priority new work items without first having to execute every work item represented in the sequence.

Implementations of this aspect of the invention may include one or more of the following features. The age of the sequence or how near the sequence is to full exhaustion may affect when the substitute sequence is generated.

In accordance with another aspect of the invention, a computer system executable method is provided for selectively providing work items to an operator attended computer station from a plurality of work items stored in a database accessible by the computer station. The method includes the step of building a first ordered list of work items in the database for execution by the operator attending the computer station. An amount of elapsed time is determined since the ordered list was built for the computer station. The elapsed time is compared to a predetermined time interval. If the elapsed time is greater than the predetermined time interval, a second ordered list of work items is built from the database and the system is configured to replace the first ordered list with the second ordered list to enable the computer station to use the second ordered list for subsequent execution by the attendant operator.

With such a method, the first ordered list is preferably replaced before becoming empty, allowing the system to take into account new work items arriving in the database of work items. As a result, the computer station is able to gain access to high-priority new work items before exhausting the existing ordered list.

In another accordance with another aspect of the invention, an amount of unused entries in the first (i.e., working) ordered list is also determined. The amount of unused entries is compared to a predetermined threshold number of unused entries. If the elapsed time is greater than the predetermined time interval or if the amount of unused entries is less than the predetermined threshold number of unused entries, a second ordered list is built in parallel. If the elapsed time is greater than a predetermined useful lifetime of the first ordered list, the system waits until the system is configured to use the second ordered list as the working ordered list and then provides a work item to the computer station for execution by the attendant operator.

Such method helps to avoid excessive delays. For example, if building the second ordered list were initiated for time-related reasons only, an idle delay would occur if the system used up entries so quickly that the list became exhausted before it became time to initiate building a new ordered list. Likewise, if such building were initiated for use-related reasons only, an excessive delay in executing high-priority new work items would occur if the system used up entries so slowly that the existing ordered list were rarely replaced.

In addition, a parallel process is used for building the new ordered list, allowing use of the existing working ordered list while the new ordered list is being built. Such use helps the system avoid excessive idle delays.

Implementations of these aspects of the invention may include one or more of the following features.

The predetermined time interval may be a preferred rebuilding interval or a predetermined useful lifetime of the first ordered list and the second ordered list may be built using a parallel process. The work item may be selected after the system is configured to use the second ordered list as the working ordered list or regardless of when the system is configured to use the second ordered list as the working ordered list.

In accordance with still another aspect of the invention, a method is provided for providing a workflow work item to a computer station from a database of workflow work items stored in a computer system. The method includes the step of initiating the computer system to build in parallel a new ordered list from the work items stored in the database. The new ordered list has a predetermined useful lifetime and has a predetermined plurality of entries. Each entry corresponds to one of the work items in the database. A count of unused entries takes into account each entry. The entries are ordered for execution in accordance with predetermined criteria. A time when the new list was built is recorded. The system is configured to use the new ordered list as a working ordered list by the computer station. Next, the method includes the step of waiting until the system is configured to use the new ordered list as the working ordered list. The system then waits until receipt of a request to provide one of the work items in the new ordered list to the computer station. A comparison is made of the count of unused entries to a low count (e.g., zero). If the count of unused entries is not equal to the low count, a determination is made as to an amount of elapsed time since the working ordered list was built and a determination is made as to whether the elapsed time is greater than the predetermined useful lifetime. If the count of unused entries is equal to the low count or if the elapsed time is greater than the useful lifetime, the system initiates building in parallel a new ordered list and the system waits until the system is configured to use the new ordered list as the working ordered list. If, on the other hand, the count of unused entries is not equal to the low count and the elapsed time is not greater than the useful lifetime, the count of unused entries is compared to a predetermined threshold amount. If the count of unused entries is not less than the threshold amount, the elapsed time is compared to a preferred rebuilding interval. If the count of unused entries is less than the threshold amount or the elapsed time is greater than the rebuilding interval, the parallel process is initiated for building a new ordered list. From the database of work items, a selection is made of a work item corresponding to a first entry in the working ordered list. The count of unused entries in the working ordered list is decremented. The selected work item is provided to the computer station in response to the request and the system waits again for receipt of a request to provide another work item to the operator terminal.

BRIEF DESCRIPTION OF THE DRAWINGS

Other aspect, features, and advantages of the invention, as well as the invention itself, will become more readily apparent when read together with the following detailed description taken together with the accompanying drawings, in which:

FIGS. 5–9 are flow diagrams of methods for providing a workflow work item from a database of work items according to the invention.

DESCRIPTION OF THE PREFERRED EMBODIMENTS

Figure 1:
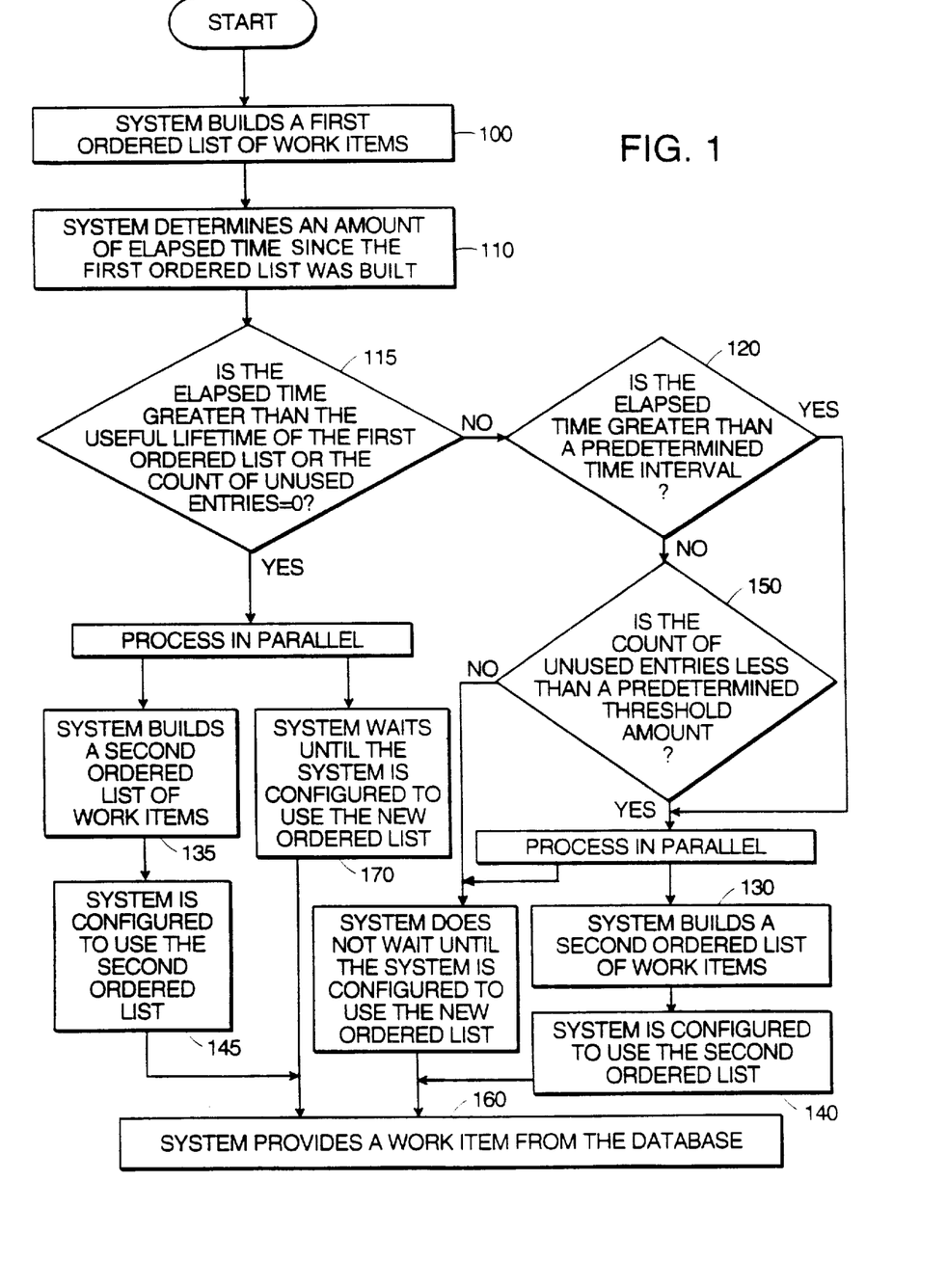
FIG. 1 is a flow diagram of a method for providing a workflow work item from a database of work items according to the invention.

Referring now to FIG. 1, a process is shown for presenting one of a plurality of workflow works items 10 (FIG. 4) to an attendant, not shown, at one of a plurality of computer stations (i.e., operator stations) 12. The work flow items 10 are stored in database 14 of computer system 16. The database 14 of work items 10 may be implemented using an Oracle® Pyramid® database system version 7.2. The computer system 16 may include a Pyramid® NILE™ computer having eight central processing units and two gigabytes of fast-access memory. Here, an operating system such as Data Center Operating System ("DC-OSx") runs on the computer system 16. The computer system 16 also runs a workflow application program 20 providing key functions used to provide a workflow management system as, for example, described by the Workflow Management Coalition in *Workflow Management Coalition Terminology & Glossary Issue 2.0* (1996), which is incorporated herein by reference.

Figure 4:
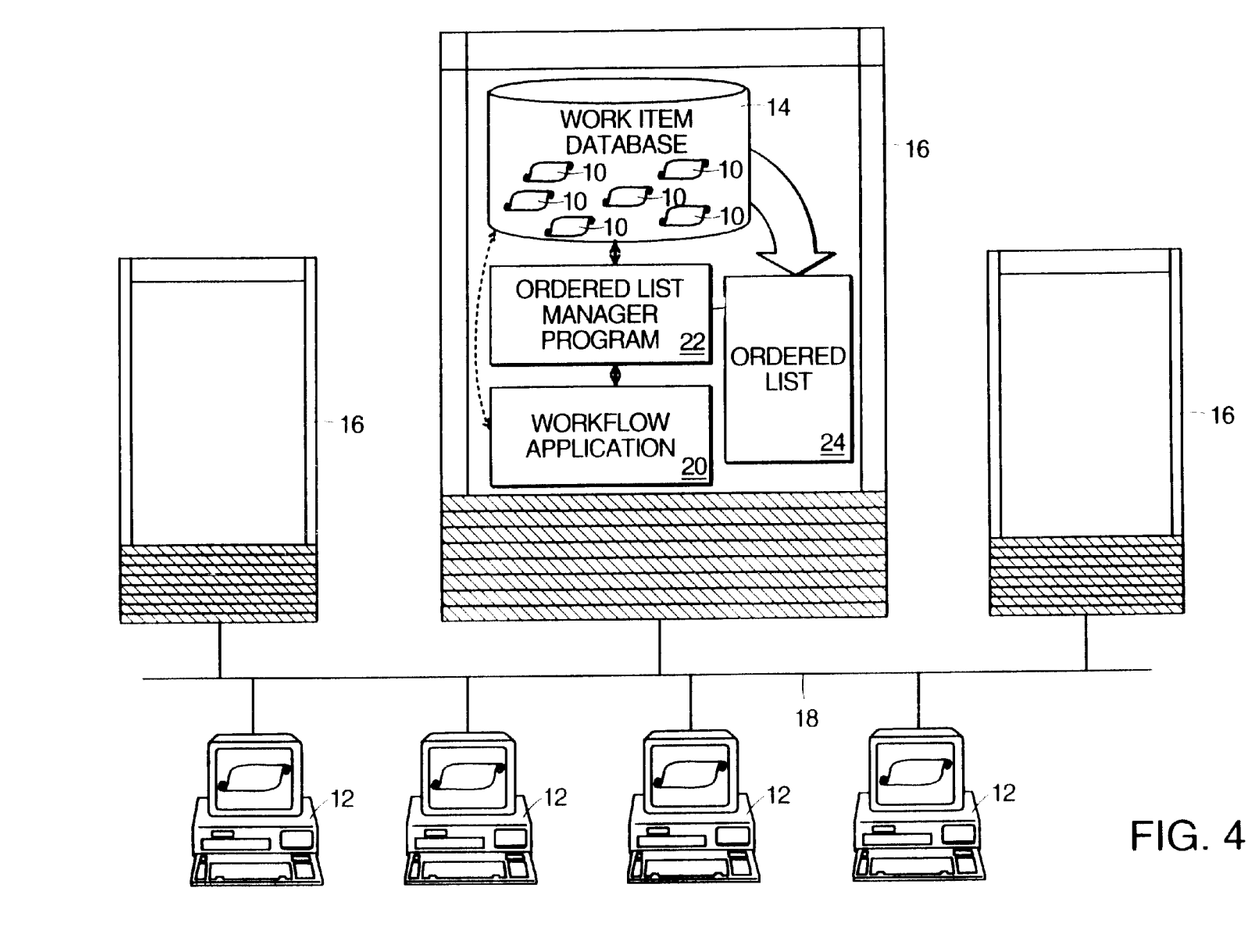
FIG. 4 is a block diagram of a computer system for execution of the method of FIG. 1 and the method of FIGS. 2 and 3.

Each one of the computer stations 12 may be a personal computer running an operating system such as Microsoft® Windows® 3.1, Microsoft® Windows®95, or Microsoft® Windows® NT™. The computer system 16 and the computer stations 12 are interconnected across a bidirectional data connection bus 18 such as a network connection provided by a computer network using a TCP/IP protocol.

An ordered list manager program 22 stored in the computer system 16 also runs on the computer system 16 to control an ordered list 24 of work items to be presented to the computer stations 12 for execution by the attendants, not shown. The ordered list manager program 22 may be implemented using a Pyramid® C compiler program version 4.0. The ordered list may be implemented as a data structure in fast-access memory or may be implemented as another database. If implemented as another database, the ordered list manager program 22 may reside in non-volatile memory such as a hard disk and may be accessible to another computer in the event the Pyramid® NILE™ computer suffers a failure blocking access to the ordered list. Preferably, use of the list manager program 22 and the ordered list 24 is selectable and is "transparent" to the computer stations 12, i.e., processing at the computer station 12 is unaffected by whether such use is selected, or is not selected.

Assuming such use is selected, the system provides the ordered list 24 (FIG. 5) having multiple entries 26. Each entry 26 corresponds to one of the work items 10 in the work item database 14. In addition, the list manager program 22 (FIG. 4) maintains a count 28 of unused entries in the ordered list 24. As described in more detail below, as entries 26 are used to provide corresponding work items 10 to the computer stations 12 from the database 14, the count 28 is decremented.

Figure 5:
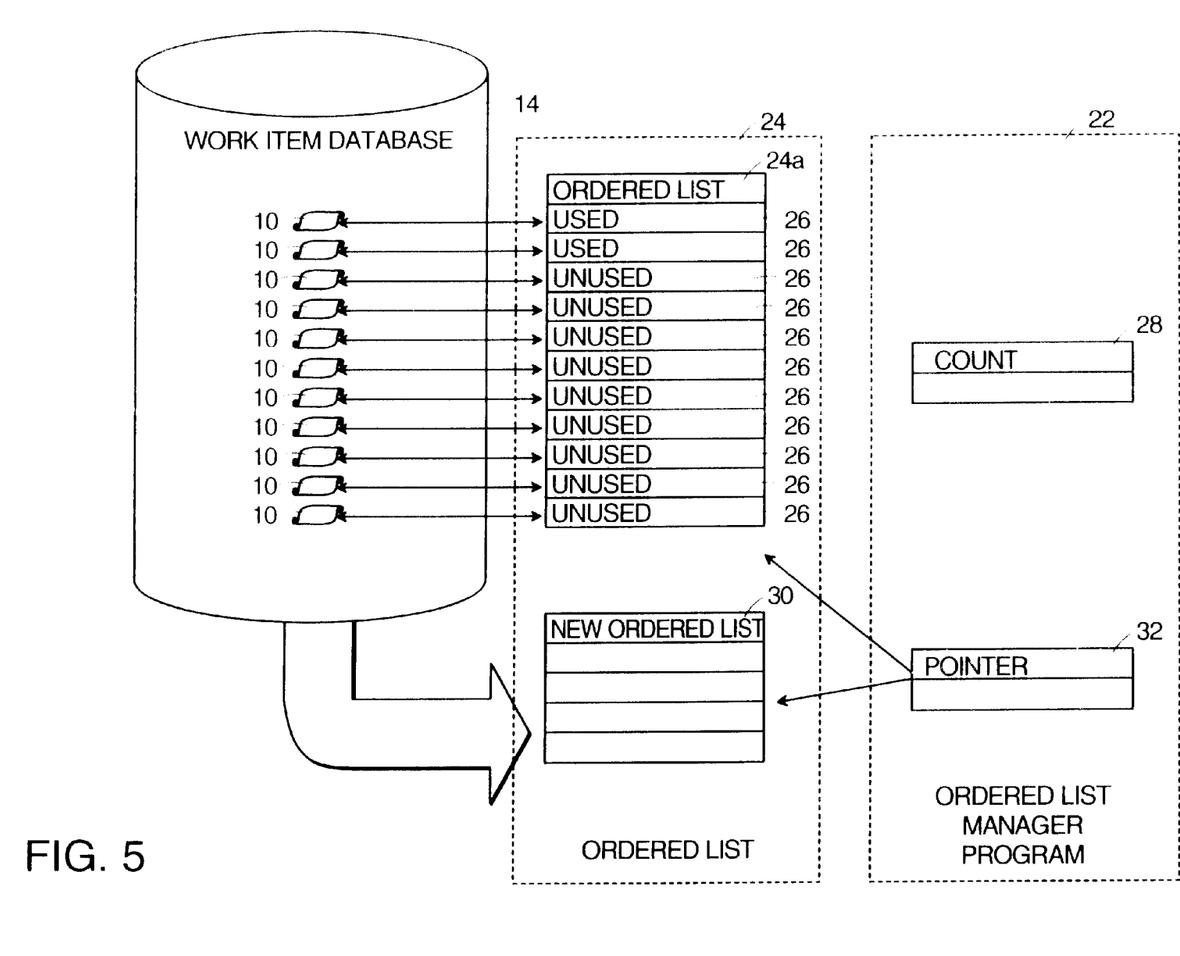
FIG. 5 is a block diagram of data structures for use with the method of FIG. 1 and the method of FIGS. 2 and 3.

Also as described in more detail below, the ordered list 24 is replaced with a new ordered list 30 when one or more predetermined conditions, to be described, is met. The replacement is complete when a pointer 32 is changed to refer to the new ordered list 30. Subsequently, the replacement is repeated whenever necessary according to the predetermined conditions, to be described. The ordered list 24 is so replaced to efficiently provide work items 10 from the work item database 14 to the computer stations 12.

Referring now to FIG. 1, the list manager program 22 is executable by the computer system 16 to selectively provide work items to the operator attended computer station 12 from the plurality of work items 10 stored in the database 14. The list manager program 22 executes a method including the step of building a first ordered list (i.e., an original sequence) 24A of work items 10 in the database 14 for execution by the operator attending the computer station 12 (step 100). An amount of elapsed time is determined since the ordered list 24A was built (step 110). The elapsed time is compared to a predetermined time interval (steps 115, 120). If the elapsed time is greater than the predetermined time interval, a second ordered list (i.e., a substitute sequence) 30 of work items is built from the database 14 (steps 130, 135) and the system is configured to replace the first ordered list 24A with the second ordered list 30 to enable the computer station to use the second ordered list 30 for subsequent execution by the attendant operator (steps 140, 145).

Also, a count 28 representing an amount of unused entries in the first (i.e., working) ordered list 24A is compared to a predetermined threshold number of unused entries (step 150). Building the second ordered list in parallel is initiated if the elapsed time is greater than the predetermined time interval or if the amount of unused entries is less than the predetermined threshold number of unused entries (step 130, 135). If the elapsed time is greater than a predetermined useful lifetime of the first ordered list, the system waits until the system is configured to use the second ordered list 30 as the working ordered list (step 170). Otherwise, the system does not wait. In either case, the system then provides a work item 10 to the computer station 12 for execution by the attendant operator (step 160).

More particularly, and referring again also to FIGS. 2 and 3, the ordered list manager program 22 starts by initiating building the ordered list 24A for a preselected type of computer station 12 (step 300) and then waits until the system 16 is configured to use the ordered list 24A as a working ordered list for use with the computer station 12 (step 305). The building of the ordered list 24A is initiated by activating a parallel process, i.e., a process executing independently of the list manager program 22. Consequently, while the list manager program 22 waits, the parallel process builds a new ordered list having entries as described above, with the entries ordered for execution in an order in accordance with predetermined criteria (step 1400). The entries are produced by submitting to the database 14 of work items 10 a database query such as a structured query language ("SQL") query constructed by an administrator of the system 16. In accordance with the predetermined criteria (step 1400), the database 14 query operates as a filter on the database 14 of work items 10. The predetermined criteria (step 1400) determine not only which one of the work items 10 in the database 14 will be represented by entries in the new ordered list, but also the preferred order in which the work items 10 are to be executed at the preselected type of computer station 12. The criteria take into account various characteristics associated with a work item 10, such as the size of a transaction involved, how long the work item 10 has existed without execution, the size or type of an account involved, and whether an operator at the preselected type of computer station is expected to be qualified to handle execution of the work item 10.

Figure 2:
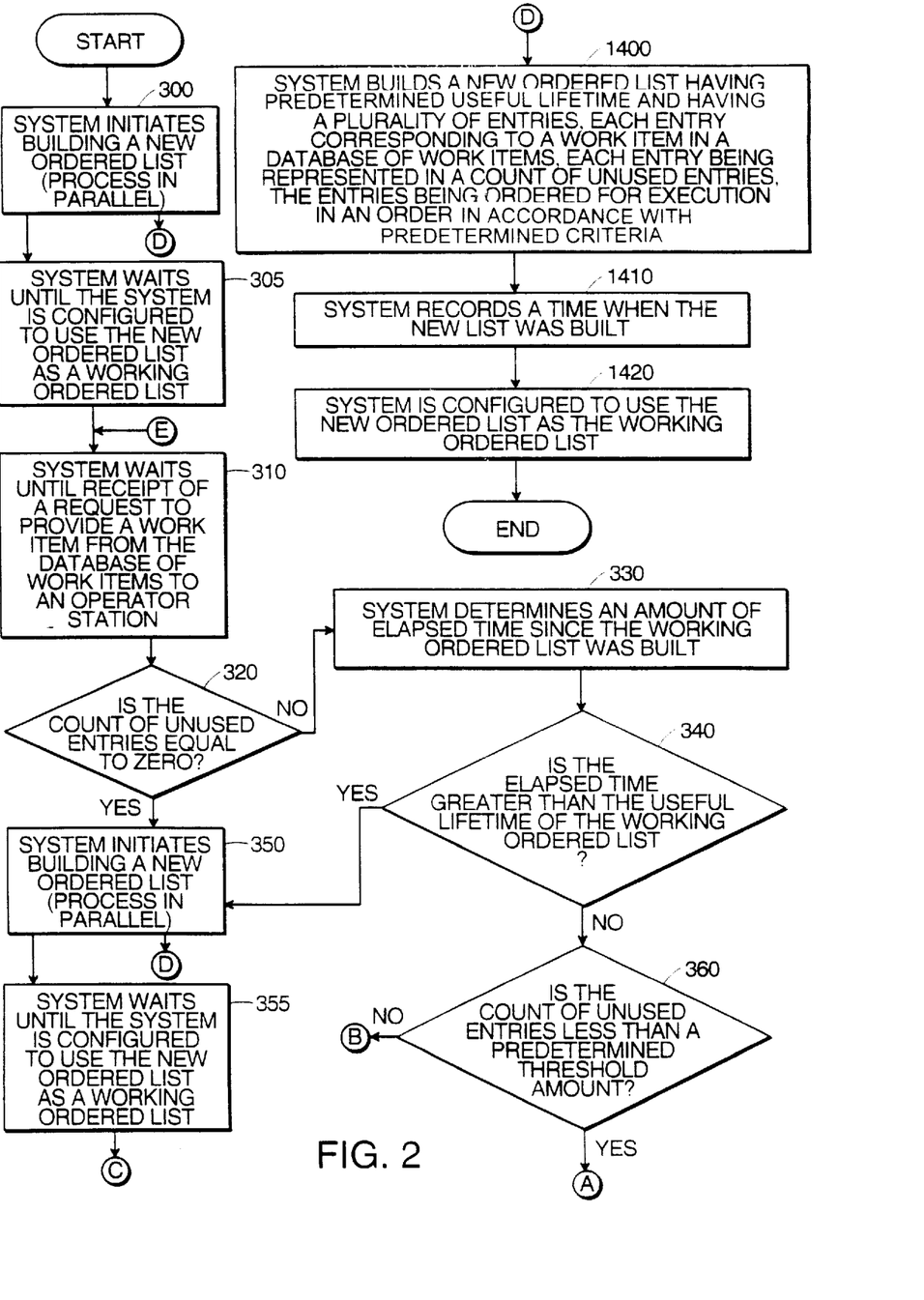
FIGS. 2 and 3 when taken together make up a flow diagram of a method for providing a workflow work item from a database of work items according to the invention.
Figure 3:
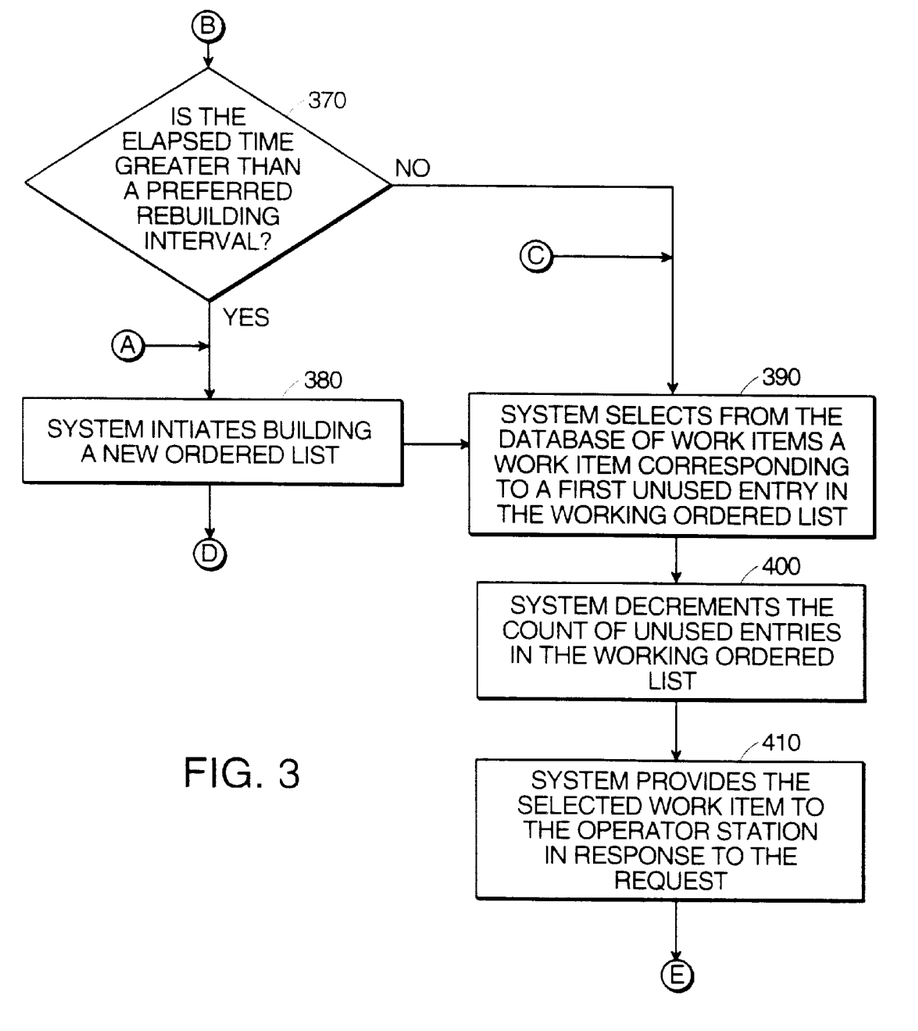

In addition, the new ordered list is associated with the predetermined useful lifetime mentioned above (step 1400). The predetermined useful lifetime is an amount of time defining how long an ordered list may be used before the ordered list's entries are considered out-of-date. Thus, as discussed below, the predetermined useful lifetime is used in a determination about whether the working ordered list should be replaced.

Next, the parallel process records a time when the new ordered list was built (step 1410). Like the predetermined useful lifetime, the time when the new ordered list was built is used, as discussed below, in a determination about whether the list should be replaced.

The parallel process finishes by configuring the system to use the new ordered list as the working ordered list 24A (step 1420). The parallel process so configures by changing the pointer 32 to refer to the new ordered list.

At this point, the list manager program 22 stops waiting because the parallel process has configured the system to use the new ordered list as the working list. Now the list manager program 22 begins a processing loop in which the list manager program 22 remains until shut down.

First, the list manager program 22 waits until the list manager program 22 receives a request to provide a work item 10 from the work item database 14 to the computer station 12 (step 310). Such a request may be generated at the computer station 12 when an operator logs in to the computer station 12, i.e., prepares the computer station 12 for use by the operator, or when execution of a previously-provided work item 10 is complete.

After the request is received, the list manager program 22 compares the count 28 of unused entries to a count of zero (step 320). Such a comparison allows the list manager program 22 to determine whether the working ordered list 24A is logically empty, which is one of the predetermined conditions mentioned above.

If the count 28 is not equal to zero, i.e., if the ordered list is not empty, the list manager program 22 then determines an amount of elapsed time since the working ordered list 24A was built (step 330). In essence, the amount of elapsed time reflects the age of the working ordered list 24A at the time the request was received. The amount of elapsed time is determined using the time when the list 24A was built, as previously recorded by the parallel process, and a current time obtained from a clock provided by the system. The list manager program 22 calculates the amount of elapsed time by taking the difference between the current time and the time when the list was built.

After calculating the amount of elapsed time, the list manager program 22 then compares the amount of elapsed time to the useful lifetime of the working ordered list (step 340). Such a comparison allows the list manager program 22 to determine whether the working ordered list is out-of-date and should be replaced. The useful lifetime may be set to any length of time, such as 20 minutes, and is predetermined in order to take into account new work items 10 arriving in the work item database 14. A computer station 12 requesting a work item 10 from the list manager program 22 has no access to such a new work item 10 until a new ordered list is built subsequent to the new work item's arrival in the database 14. The lack of access results from the working ordered list's lack of an entry 26 corresponding to the new work item 10. Without a predetermination of the useful lifetime for the working ordered list, the new work item 10 could languish in the work item database 14 for an excessive amount of time. For example, the new work item 10 might languish even if the new work item 10 merits immediate attention according to the predetermined criteria.

Therefore, if the ordered list 24A is empty or the elapsed time is greater than the useful lifetime, the list manager program 22 initiates building a new ordered list 30 (step 350) and waits until the system is configured to use the new ordered list as the working ordered list (step 355). Otherwise, the list manager program 22 compares the count 28 of unused entries to a predetermined threshold amount of unused entries (step 360). The threshold amount is used to detect when the working ordered list is sufficiently close to being logically empty that building a new ordered list should be initiated. Preferably, the working ordered list is replaced often enough that the list manager program 22 is never forced to wait for the system to be configured to use a new ordered list as a working ordered list. That is, it is preferred that the list manager program 22 is always able to use an existing working ordered list while a new ordered list is being built by the parallel process. Achieving such use avoids causing expensive idle delays at the computer station 12. In an example, the count 28 of unused entries may be equal to 5, requests for work items 10 may be using the entries at a rate of one per minute, and the yet-to-be-activated parallel process may take 10 minutes to complete. If so, even if the parallel process is activated immediately, the ordered list becomes logically empty minutes before the parallel process completes, forcing the list manager program 22 and the computer station 12 to wait idly at that point. Accordingly, in such circumstances, the parallel process is preferably activated earlier, when the count 28 is equal to a number that is at least 10, not later when the count 28 is equal to 5. To attempt to accomplish such an earlier activation, the threshold amount is set to a number that is at least 10. Of course, because there are usually variations in the rate at which entries are used, the threshold amount may not always ensure the avoidance of delays. In addition, if the threshold amount is set too high, the list manager program 22 may activate the parallel process so frequently as to consume an excessively large portion of the system's data processing resources. Such consumption can hurt the system's performance in executing other programs running on the system. For flexibility, the threshold amount may be set to any number, such as a number representing 70% of a total number of entries in the working ordered list.

If the count 28 of unused entries is not less than the predetermined threshold amount, the list manager program 22 then compares the elapsed time to a preferred rebuilding interval (step 370). Like the predetermined threshold amount, the preferred rebuilding interval is used for preferably replacing the working ordered list often enough to avoid idle delays. More particularly, the preferred rebuilding interval represents an amount of time corresponding to a preferred frequency with which the parallel process is activated to replace the working ordered list. Like the useful lifetime, the preferred rebuilding interval may be set to any amount of time, such as 10 minutes.

If the elapsed time is greater than the preferred rebuilding interval or, as mentioned above, if the count 28 of unused entries is less than the predetermined threshold amount, the list manager program 22 initiates building a new ordered list (step 380). Unlike the previously-mentioned instances of such initiation, here the list manager program 22 does not wait for the system to be configured to use the new ordered list as the working ordered list. Instead, the list manager program 22 continues to use the existing working ordered list while the parallel process is building the new ordered list. Waiting is unnecessary here because the existing working ordered list is not logically empty and is not out-of-date. Rather, as mentioned above, the parallel process is activated here in an effort to avoid an idle delay at a future point in time.

After so initiating building a new ordered list, or after waiting if waiting was indicated above (see step 355), the list manager program 22 selects from the database 14 of work items a work item 10 corresponding to a first unused entry 26 in the working ordered list (step 390). If the list manager program 22 has been waiting for the parallel process to complete building a new ordered list, the list manager program 22 selects a work item 10 corresponding to the very first entry 26 in the ordered list. Otherwise, the list manager program 22 uses the first unused entry 26.

Next, the list manager program 22 decrements the count 28 of unused entries in the working ordered list (step 400). Decrementing the count 28 also includes marking as used the entry 26 corresponding to the selected work item 10. In addition, because the ordered list may feed more than one computer station 12, the selected work item 10 is listed in a table configured to store a notation identifying the computer station 12 having provided the request leading to the selection of the work item 10. Preferably stored in non-volatile memory, such a table is useful for recovering gracefully from a system failure due to a problem such as a power failure.

Finally, the selected work item 10 is provided to the computer station 12 in response to the request (step 410). More particularly, a copy of the selected work item 10 is made and the copy is provided to the computer station 12. In the database 14 of work items, the selected work item 10 is marked as having been provided to a computer station 12. Such a marking is provided to prevent the selected work item 10 from being represented in another ordered list built subsequently by the parallel process. Preventing such representation is important, because otherwise the same work item 10 could end up being provided to another computer station 12, resulting in inefficient duplication of work. At this point, processing of the request is complete and the list manager program 22 returns to the start of the processing loop (see step 310).

Figure 6:
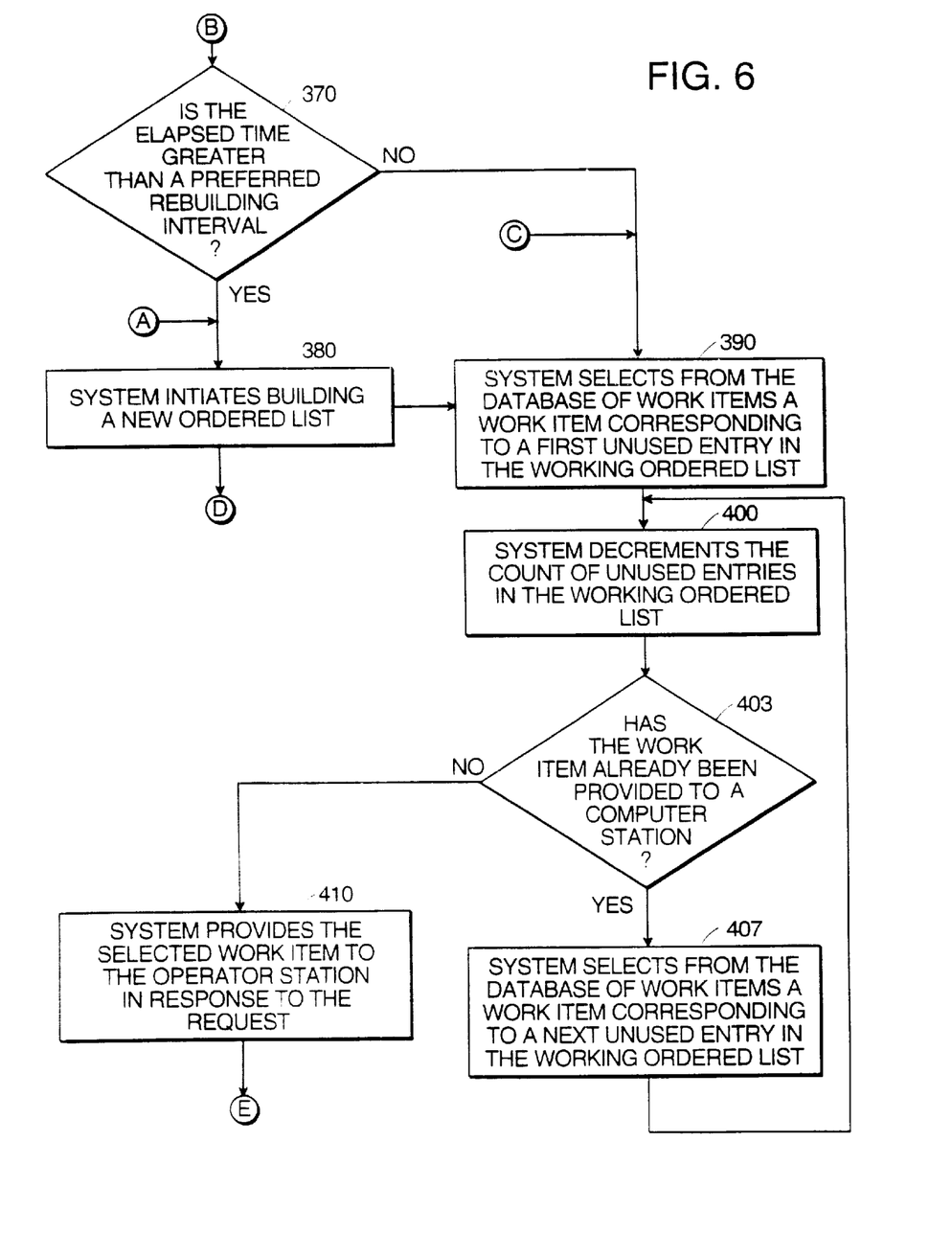

In another embodiment, an unselected work item 10 may be represented in more than one ordered list simultaneously. Such simultaneous representation is possible because the work item 10 may satisfy more than one set of predetermined criteria and thus may be appropriate for execution at more than one type of computer station 12. In this embodiment, an ordered list's list manager program 22 makes an additional check when the list manager program 22 identifies an unused entry 26 to use for selecting a corresponding work item 10 from the database 14. In the additional check, the list manager program 22 determines whether the corresponding work item 10 has been marked in the database 14 as having already been provided to a computer station 12 (FIG. 6, step 403). If the corresponding work item 10 has such a marking, the list manager program 22 skips the identified entry 26 and proceeds to the next unused entry 26 in the ordered list (step 407).

Figure 7:
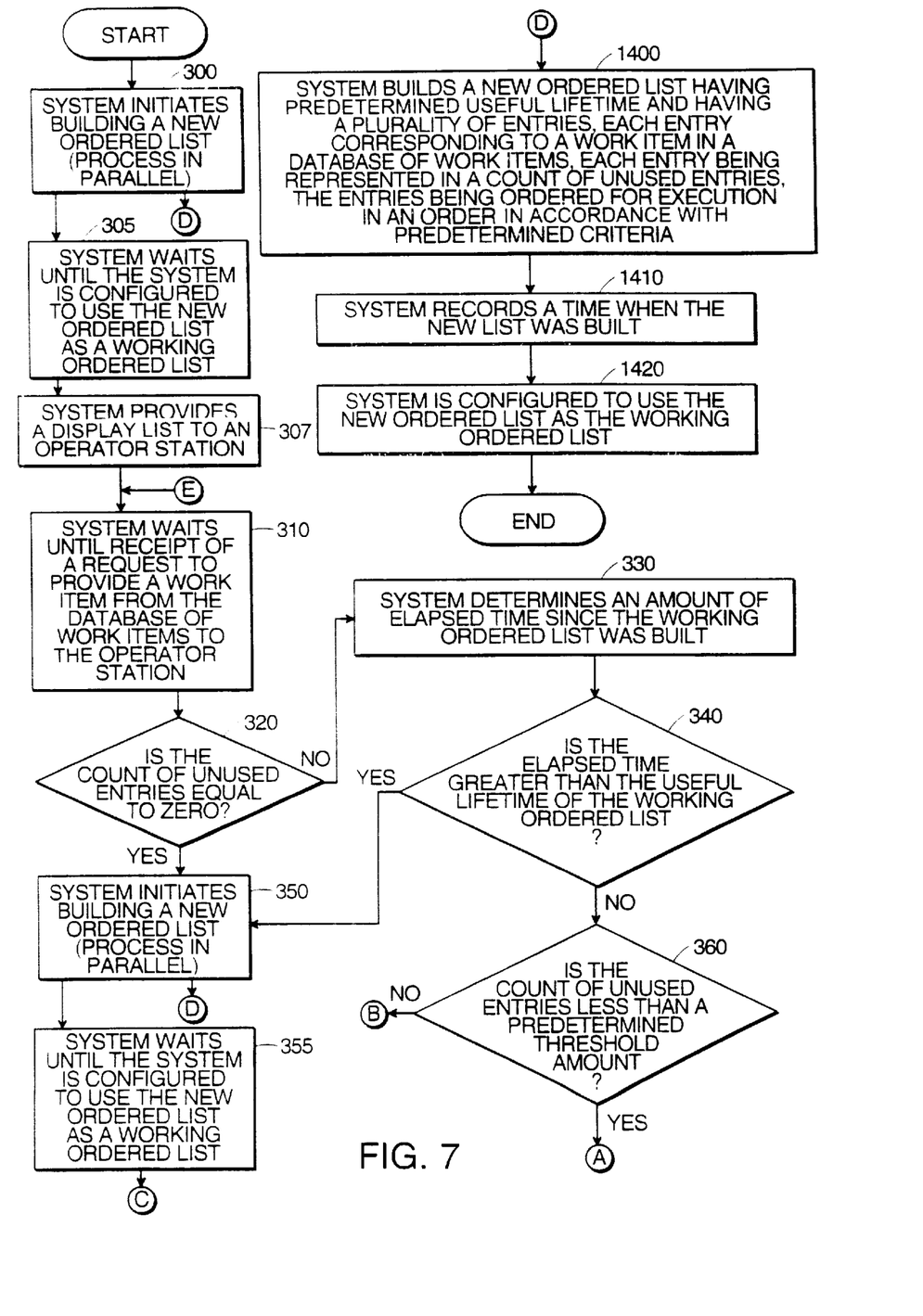

In still another embodiment, a computer station 12 initially makes a request not for a work item 10 but for a display list of work items 10. The display list appears on a display screen at the computer station 12. The computer station 12 may make such a request to allow an operator at the computer station 12 to hand-pick work items 10 for execution. Depending on how the system is configured, the display list may simply correspond to a subset of the ordered list or may be involved with additional processing. For example, the display list may be generated in response to a query specifying work items 10 having particular characteristics, such as a specific account type or a sufficient account size. Regardless of the configuration, the display list is provided by the list manager program 22 (FIG. 7, step 307). Entries in the display list correspond to work items 10 much as the entries 26 of the ordered list correspond to work items 10. The operator at the computer station 12 is expected to select for execution a work item 10 corresponding to an entry in the display list. Each entry of the display list includes sufficient information about the work item 10 to allow such a selection. The information may include a subset of fields of information associated with the work item 10. Preferably, this information is provided directly by the ordered list to avoid requiring the list manager program 22 to retrieve the information from the database 14 of work items before providing the display list. After the selection of a work item 10 is made at the computer station 12, the list manager program 22 marks the work item 10 and the work item's ordered list entry 26 as discussed above. The work item 10 is then provided to the computer station 12.

Figure 8:
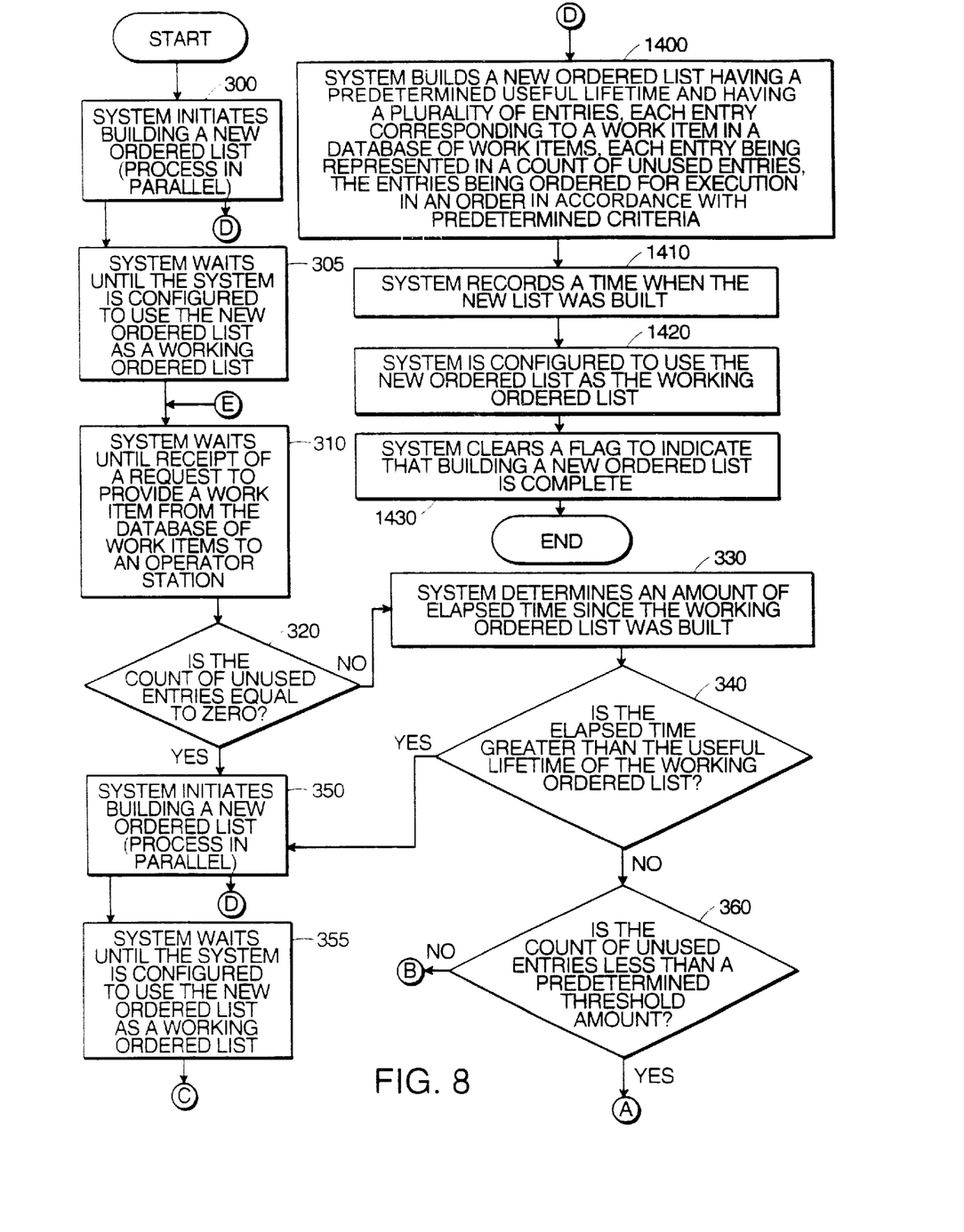
Figure 9:
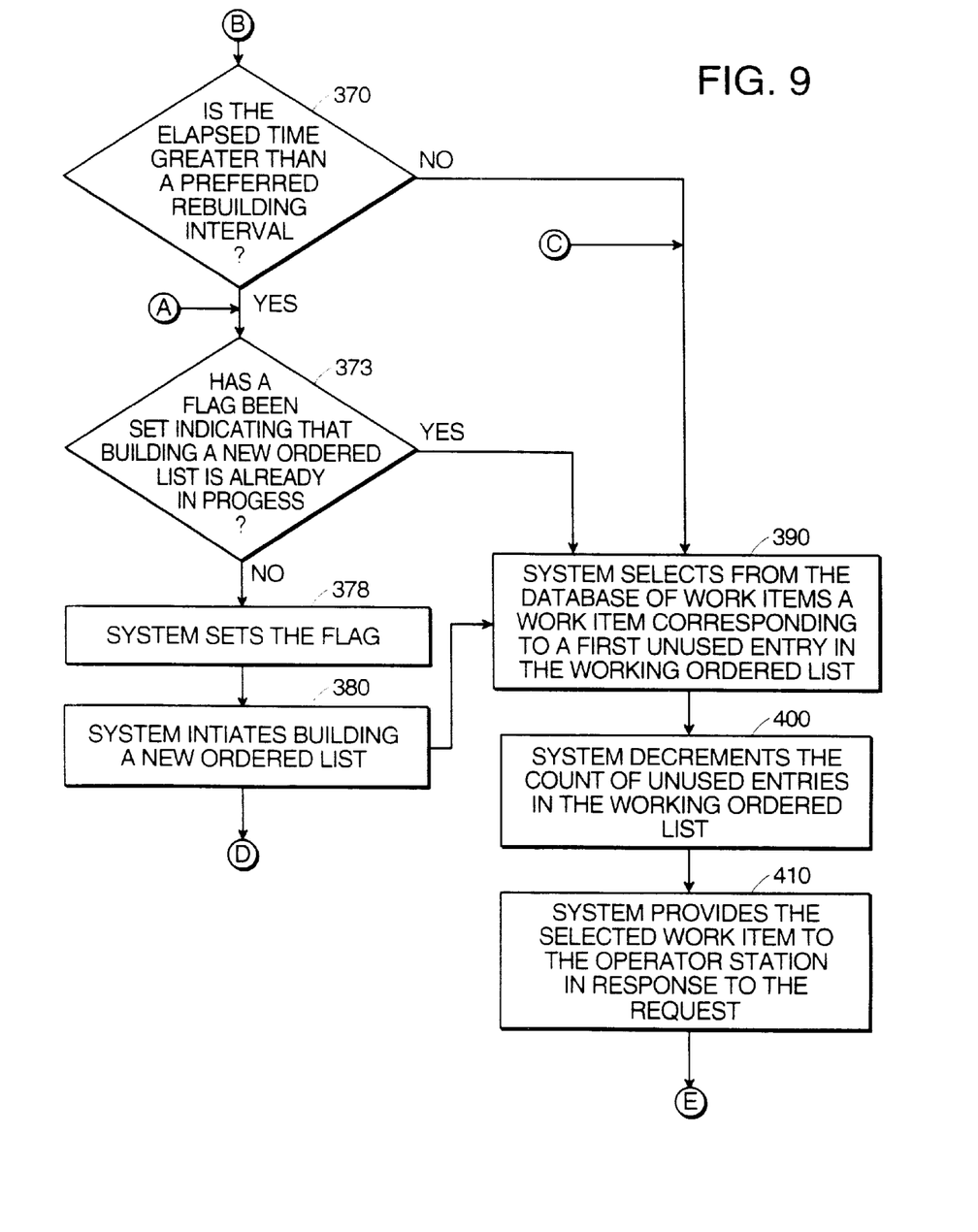

In yet another embodiment (FIGS. 8, 9), a flag is set when the parallel process is activated in response to the count 28 being below the threshold amount or the elapsed time being greater than the preferred rebuilding interval (step 378). Checked before initiation (step 373) and cleared when the parallel process is completed (step 1430), the flag helps prevent unnecessary duplication of initiations and activations. Without the flag, such duplication is possible if the period of time between consecutive requests received by the list manager program 22 is shorter than the amount of time required by the parallel process to complete. In such a case, after one request resulted in an initiation activating the parallel process, an immediately following request would cause the parallel process to be activated immediately again. Such immediate re-activation would needlessly waste data processing resources, because a new ordered list would already be available after completion of the first activation. Preferably, the flag is not used in cases where the parallel process is activated in response to the ordered list being empty or the elapsed time being greater than the useful lifetime. Avoiding such use also helps prevent the waste of data processing resources, by making checking for the flag unnecessary in these cases where duplication is unlikely. In these cases, duplication is unlikely at least because the ordered list rarely becomes empty and because the elapsed time is rarely greater than the useful lifetime. Such rarity results from these cases being pre-empted by the circumstances under which the flag is preferably used. For example, duplication may occur at the beginning of a work day, when an out-of-date ordered list may be the subject of multiple requests, perhaps from multiple computer stations 12. If so, the requests may cause some duplication of initiation and activation, but the duplication abates after the beginning of the work day.

Other embodiments are within the scope of the following claims. For example, depending on the nature of the work items 10 involved, the computer station 12 may be a terminal instead of a personal computer. In addition, instead of the Pyramid® computer, a Sun™ computer may be used. In such a case, the Sun™ computer may run an operating system such as a Sun™ operating system or a Solaris™ operating system.

The technique (i.e., the methods described above) may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A computer system executable method for use in providing work items to a computer station from a plurality of work items stored in a database, the method comprising;

generating a sequence for providing at least some of the work items to the computer station;

determining how many work items in the sequence are unused;

comparing the determined number of unused work items with a threshold value, the threshold value being greater than two unused work items; and based on the comparing, generating a substitute sequence for providing at least some of the work items.

2. The method of claim 1, wherein the age of the sequence affects when the substitute sequence is generated.

3. The method of claim 1, wherein the determining comprises maintaining a count of unused work items in the sequence.

4. A computer system executable method for selectively providing work items to a computer station from a plurality of work items stored in a database accessible by the computer station, the method comprising building a first ordered list of work items in the database for execution by an operator attending the computer station;

determining an amount of elapsed time since the first ordered list was built for the computer station;

comparing the amount of elapsed time to a predetermined time interval;

if the elapsed time is greater than the predetermined time interval, building a second ordered list of work items from the database and configuring the system to replace the first ordered list with the second ordered list to enable the computer station to use the second ordered list as a working ordered list for subsequent execution by the attendant operator;

determining an amount of unused entries in the first ordered list;

comparing the amount of unused entries to a predetermined threshold number of unused entries, the predetermined threshold being greater than two unused entries; and if the amount of unused entries is less than the predetermined threshold number of unused entries, building the second ordered list in parallel;

using one of the ordered lists to select one of the work items; and providing the selected work item to the computer station.

5. The method of claim 4, wherein the predetermined time interval is a preferred rebuilding interval; and the work item is selected regardless of when the first ordered list is replaced by the second ordered list.

6. The method of claim 4, wherein the predetermined time interval is a predetermined useful lifetime of the first ordered list; and the method further comprises waiting until the system is configured to use the second ordered list as the working ordered list before selecting one of the work items.

7. A method of providing a workflow work item to a computer station from a database of workflow work items stored in a computer system, the method comprising:

(a) initiating a parallel process for building a new ordered list, the process comprising building the new ordered list having a predetermined useful lifetime and having a plurality of entries, each entry corresponding to one of the work items in the database, each entry being represented by a count of unused entries, the entries being ordered for execution in an order in accordance with predetermined criteria;

recording a time when the new list was built; and configuring the system to use the new ordered list as a working ordered list;

(b) waiting until the system is configured to use the new ordered list as the working ordered list;

(c) waiting until receipt of a request to provide one of the work items to the computer station;

(d) comparing the count of unused entries to a count of zero;

(e) if the count of unused entries is not equal to zero, determining an amount of elapsed time since the working ordered list was built;

(f) if the count of unused entries is not equal to zero, determining whether the elapsed time is greater than the predetermined useful lifetime;

(g) if the count of unused entries is equal to zero or the elapsed time is greater than the useful lifetime, initiating the parallel process for building a new ordered list, waiting until the system is configured to use the new ordered list as the working ordered list, and proceeding to (k);

(h) if the count of unused entries is not equal to zero and the elapsed time is not greater than the useful lifetime, comparing the count of unused entries to a predetermined threshold amount;

(i) if the count of unused entries is not less than the threshold amount, comparing the elapsed time to a preferred rebuilding interval;

(j) if the count of unused entries is less than the threshold amount or the elapsed time is greater than the rebuilding interval, initiating the parallel process for building a new ordered list;

(k) selecting from the database of work items a work item corresponding to a first entry in the working ordered list;

(l) decrementing the count of unused entries in the working ordered list; and (m) providing the selected work item to the computer station in response to the request and proceeding to (c).

8. Computer software, residing on a computer-readable storage medium, comprising instructions for use in a computer system for use in providing work items to a computer station from a plurality of work items stored in a database, the instructions causing the system to:

generate a sequence for providing at least some of the work items to the computer station;

determine how many work items in the sequence are unused;

compare the determined number of unused work items with a threshold value, the threshold value being greater than two unused work items; and based on the comparison, generating a substitute sequence for providing at least some of the work items.

9. The computer software of claim 8, wherein the age of the sequence affects when the substitute sequence is generated.

10. The computer software of claim 8, wherein the instructions that determine comprise instructions maintaining a count of unused work items in the sequence.

11. Computer software, residing on a computer-readable storage medium, comprising instructions for use in a computer system for selectively providing work items to a computer station from a plurality of work items stored in a database accessible by the computer station, the instructions causing the system to:

build a first ordered list of work items in the database for execution by an operator attending the computer station;

determine an amount of elapsed time since the first ordered list was built for the computer station;

compare the amount of elapsed time to a predetermined time interval;

if the elapsed time is greater than the predetermined time interval, build a second ordered list of work items from the database and configure the system to replace the first ordered list with the second ordered list to enable the computer station to use the second ordered list as a working ordered list for subsequent execution by the attendant operator;

determine an amount of unused entries in the first ordered list;

compare the amount of unused entries to a predetermined threshold number of unused entries, the threshold value being greater than two unused entries; and if the amount of unused entries is less than the predetermined threshold number of unused entries, build the second ordered list in parallel;

use one of the ordered lists to select one of the work items; and provide the selected work item to the computer station.

12. The computer software of claim 11, wherein the predetermined time interval is a preferred rebuilding interval; and the work item is selected regardless of when the first ordered list is replaced by the second ordered list.

13. The computer software of claim 11, wherein the predetermined time interval is a predetermined useful lifetime of the first ordered list; and the computer software further comprises instructions for causing the system to wait until the system is configured to use the second ordered list as the working ordered list before selecting one of the work items.

14. Computer software, residing on a computer-readable storage medium, comprising instructions for use in a computer system to provide a workflow work item to a computer station from a database of workflow work items stored in a computer system, the instructions causing the system to:

(a) initiate a parallel process for building a new ordered list, the process comprising
    building the new ordered list having a predetermined useful lifetime and having a plurality of entries, each entry corresponding to one of the work items in the database, each entry being represented by a count of unused entries, the entries being ordered for execution in an order in accordance with predetermined criteria;
    record a time when the new list was built; and
    configure the system to use the new ordered list as a working ordered list;

(b) wait until the system is configured to use the new ordered list as the working ordered list;

(c) wait until receipt of a request to provide one of the work items to the computer station;

(d) compare the count of unused entries to a count of zero;

(e) if the count of unused entries is not equal to zero, determine an amount of elapsed time since the working ordered list was built;

(f) if the count of unused entries is not equal to zero, determine whether the elapsed time is greater than the predetermined useful lifetime;

(g) if the count of unused entries is equal to zero or the elapsed time is greater than the useful lifetime, initiate the parallel process for building a new ordered list, wait until the system is configured to use the new ordered list as the working ordered list, and proceed to (k);

(h) if the count of unused entries is not equal to zero and the elapsed time is not greater than the useful lifetime, compare the count of unused entries to a predetermined threshold amount;

(i) if the count of unused entries is not less than the threshold amount, compare the elapsed time to a preferred rebuilding interval;

(j) if the count of unused entries is less than the threshold amount or the elapsed time is greater than the rebuilding interval, initiate the parallel process for building a new ordered list;

(k) select from the database of work items a work item corresponding to a first entry in the working ordered list;

(l) decrement the count of unused entries in the working ordered list; and (m) provide the selected work item to the computer station in response to the request and proceed to (c).

* * * * *

UNITED STATES PATENT AND TRADEMARK OFFICE
CERTIFICATE OF CORRECTION

PATENT NO. : 6,349,320 B1  Page 1 of 1
DATED : February 19, 2002
INVENTOR(S) : Emberton et al.

It is certified that error appears in the above-identified patent and that said Letters Patent is hereby corrected as shown below:

Title page,
Item [56], References Cited, U.S. PATENT DOCUMENTS, please remove "A" after each Patent No.

Column 3,
Line 53, please change "aspect" to -- aspects --.

Column 11,
Line 2, please add after "items;" and before "and" insert the following:
-- if the elapsed time is greater than a predetermined useful lifetime of the first ordered list, waiting until the first ordered list is replaced by the second ordered list before selecting one of the work items; --.

Column 12,
Line 52, please add after "items;" and before "and" insert the following:
-- if the elapsed time is greater than a predetermined useful lifetime of the first ordered list, waiting until the first ordered list is replaced by the second ordered list before selecting one of the work items; --.

Signed and Sealed this

Fourth Day of February, 2003

JAMES E. ROGAN
*Director of the United States Patent and Trademark Office*